US008702217B2

(12) United States Patent
Iftime et al.

(10) Patent No.: US 8,702,217 B2
(45) Date of Patent: Apr. 22, 2014

(54) PHASE CHANGE MAGNETIC INK COMPRISING POLYMER COATED MAGNETIC NANOPARTICLES AND PROCESS FOR PREPARING SAME

(75) Inventors: Gabriel Iftime, Mississauga (CA); Peter G. Odell, Mississauga (CA); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 358 days.

(21) Appl. No.: 13/049,954

(22) Filed: Mar. 17, 2011

(65) Prior Publication Data

US 2012/0236092 A1    Sep. 20, 2012

(51) Int. Cl.
*B41J 2/01* (2006.01)

(52) U.S. Cl.
USPC ........... 347/99; 347/88; 347/100; 347/95

(58) Field of Classification Search
CPC ...... B41J 2/175903; B41J 2/01; C09D 11/34; C09D 11/52
USPC ............ 347/88, 95–100; 523/160, 161; 106/31.32, 31.64; 252/62.54, 62.55, 252/62.51 R; 160/31.32, 31.64
See application file for complete search history.

(56) References Cited

U.S. PATENT DOCUMENTS

| | | | |
|---|---|---|---|
| 4,463,034 A | 7/1984 | Tokunaga et al. | |
| 4,830,671 A | 5/1989 | Frihart et al. | |
| 4,889,560 A | 12/1989 | Jaeger et al. | |
| 4,889,761 A | 12/1989 | Titterington et al. | |
| 5,194,638 A | 3/1993 | Frihart et al. | |
| 5,195,430 A | 3/1993 | Rise | |
| 5,372,852 A | 12/1994 | Titterington et al. | |
| 5,389,958 A | 2/1995 | Bui et al. | |
| 5,597,856 A | 1/1997 | Yu et al. | |
| 5,667,924 A | 9/1997 | Ziolo | |
| 5,750,604 A | 5/1998 | Banning et al. | |
| 5,780,528 A | 7/1998 | Titterington et al. | |
| 5,782,966 A | 7/1998 | Bui et al. | |
| 5,783,658 A | 7/1998 | Banning et al. | |
| 5,827,918 A | 10/1998 | Kassal | |
| 5,830,942 A | 11/1998 | King et al. | |
| 5,866,637 A | 2/1999 | Lorenz | |
| 5,919,839 A | 7/1999 | Titterington et al. | |
| 6,174,937 B1 | 1/2001 | Banning et al. | |
| 6,255,432 B1 | 7/2001 | Evans et al. | |
| 6,262,129 B1 * | 7/2001 | Murray et al. | 516/33 |
| 6,309,453 B1 | 10/2001 | Banning et al. | |
| 6,767,396 B2 | 7/2004 | Mcelligott et al. | |
| 6,860,930 B2 | 3/2005 | Wu et al. | |
| 7,407,572 B2 | 8/2008 | Steffens | |
| 7,563,489 B2 * | 7/2009 | Carlini et al. | 427/466 |
| 7,625,956 B2 * | 12/2009 | Odell et al. | 522/173 |
| 7,749,300 B2 | 7/2010 | Chretien et al. | |
| 7,789,935 B2 | 9/2010 | Chretien et al. | |
| 7,973,186 B1 | 7/2011 | Goredema et al. | |
| 8,303,838 B2 * | 11/2012 | Iftime et al. | 252/62.54 |
| 8,313,666 B2 * | 11/2012 | Iftime et al. | 252/62.54 |
| 8,360,546 B2 * | 1/2013 | Iftime et al. | 347/20 |
| 2005/0142352 A1 * | 6/2005 | Hattori et al. | 428/323 |
| 2007/0249747 A1 * | 10/2007 | Tsuji et al. | 522/3 |
| 2008/0220231 A1 * | 9/2008 | Suetsuna et al. | 428/216 |
| 2009/0321676 A1 * | 12/2009 | Breton et al. | 252/62.53 |
| 2010/0015462 A1 | 1/2010 | Bradshaw et al. | |
| 2010/0028537 A1 | 2/2010 | Goredema et al. | |
| 2010/0060539 A1 * | 3/2010 | Suetsuna et al. | 343/787 |
| 2010/0140916 A1 * | 6/2010 | Firth et al. | 283/82 |
| 2010/0292467 A1 | 11/2010 | Goredema et al. | |
| 2010/0304006 A1 | 12/2010 | Delpech et al. | |
| 2011/0048171 A1 | 3/2011 | Enright et al. | |
| 2011/0059233 A1 | 3/2011 | Liu et al. | |
| 2011/0151375 A1 | 6/2011 | Chretien et al. | |
| 2012/0012778 A1 * | 1/2012 | Tilley et al. | 252/62.55 |
| 2012/0162330 A1 * | 6/2012 | Iftime et al. | 347/88 |
| 2012/0235074 A1 * | 9/2012 | Iftime et al. | 252/62.53 |
| 2012/0235075 A1 * | 9/2012 | Iftime et al. | 252/62.54 |
| 2012/0235077 A1 * | 9/2012 | Iftime et al. | 252/62.54 |
| 2012/0235078 A1 * | 9/2012 | Iftime et al. | 252/62.54 |
| 2012/0235079 A1 * | 9/2012 | Iftime et al. | 252/62.54 |
| 2012/0236064 A1 * | 9/2012 | Iftime et al. | 347/20 |
| 2012/0236065 A1 * | 9/2012 | Iftime et al. | 347/20 |
| 2012/0236088 A1 * | 9/2012 | Iftime et al. | 347/88 |
| 2012/0236089 A1 * | 9/2012 | Iftime et al. | 347/88 |
| 2012/0236090 A1 * | 9/2012 | Iftime et al. | 347/88 |
| 2012/0236091 A1 * | 9/2012 | Iftime et al. | 347/88 |

FOREIGN PATENT DOCUMENTS

| | | |
|---|---|---|
| GB | 2238792 | 6/1991 |
| GB | 2294939 | 5/1996 |
| GB | 2305928 | 4/1997 |
| WO | WO 93/23795 | 11/1993 |

(Continued)

OTHER PUBLICATIONS

Gabriel Iftime, et al., U.S. Appl. No. 13/049,937, filed Mar. 17, 2011, "Solvent Based Magnetic Ink Comprising Carbon Coated Magnetic Nanoparticles and Process for Preparing Same," not yet published, 32 pages.

(Continued)

*Primary Examiner* — Matthew Luu
*Assistant Examiner* — Rut Patel
(74) *Attorney, Agent, or Firm* — Marylou J. Lavoie

(57) ABSTRACT

A phase change magnetic ink and process for preparing same including comprising a phase change ink carrier; an optional colorant; an optional dispersant; an optional synergist; an optional antioxidant; and a polymer coated magnetic nanoparticle comprising a magnetic core and a polymeric shell disposed thereover.

18 Claims, No Drawings

(56) References Cited

FOREIGN PATENT DOCUMENTS

| WO | WO 94/14902 | 7/1994 |
|----|-------------|--------|
| WO | WO 95/04760 | 2/1995 |
| WO | WO 2009/025623 | 2/2009 |

OTHER PUBLICATIONS

Gabriel Iftime, et al., U.S. Appl. No. 13/050,403, filed Mar. 17, 2011, "Magnetic Curable Inks," not yet published, 63 pages.

Gabriel Iftime, et al., U. S. Appl. No. 13/049,950, filed Mar. 17, 2011, "Phase Change Magnetic Ink Comprising Surfactant Coated Magnetic Nanoparticles and Process for Preparing Same," not yet published, 34 pages.

Gabriel Iftime, et al., U. S. Appl. No. 13/049,942, filed Mar. 17, 2011, "Phase Change Magnetic Ink Comprising Coated Magnetic Nanoparticles and Process for Preparing Same," not yet published, 41 pages.

Gabriel Iftime, et al., U. S. Appl. No. 13/049,954, filed Mar. 17, 2011, "Phase Change Magnetic Ink Comprising Polymer Coated Magnetic Nanoparticles and Process for Preparing Same," not yet published, 36 pages.

Gabriel Iftime, et al., U. S. Appl. No. 13/049,945, filed Mar. 17, 2011, "Phase Change Magnetic Ink Comprising Inorganic Oxide Coated Magnetic Nanoparticles and Process for Preparing Same," not yet published, 32 pages.

Gabriel Iftime, et al., U. S. Appl. No. 13/050,268, filed Mar. 17, 2011, "Curable Inks Comprising Inorganic Oxide Coated Magnetic Nanoparticles," not yet published, 39 pages.

Gabriel Iftime, et al., U. S. Appl. No. 13/050,383, filed Mar. 17, 2011, "Curable Inks Comprising Polymer Coated Magnetic Nanoparticles," not yet published, 43 pages.

Gabriel Iftime, et al., U. S. Appl. No. 13/050,423, filed Mar. 17, 2011, "Curable Inks Comprising Coated Magnetic Nanoparticles," not yet published, 44 pages.

Gabriel Iftime, et al., U. S. Appl. No. 13/050,341, filed Mar. 17, 2011, "Curable Inks Comprising Surfactant Coated Magnetic Nanoparticles," not yet published, 41 pages.

Gabriel Iftime, et al., U. S. Appl. No. 13/050,223, filed Mar. 17, 2011, "Solvent-Based Inks Comprising Coated Magnetic Nanoparticles," not yet published, 37 pages.

Gabriel Iftime, et al., U. S. Appl. No. 13/050,152, filed Mar. 17, 2011, "Solvent-Based Inks Comprising Coated Magnetic Nanoparticles," not yet published, 32 pages.

Gabriel Iftime, et al., U. S. Appl. No. 13/049,936, filed Mar. 17, 2011, "Phase Change Magnetic Ink Comprising Carbon Coated Magnetic Nanoparticles and Process for Preparing Sam," not yet published, 34 pages.

\* cited by examiner

PHASE CHANGE MAGNETIC INK COMPRISING POLYMER COATED MAGNETIC NANOPARTICLES AND PROCESS FOR PREPARING SAME

RELATED APPLICATIONS

Commonly assigned U.S. patent application Ser. No. 13/049,936, entitled "Phase Change Magnetic Ink Comprising Carbon Coated Magnetic Nanoparticles And Process For Preparing Same", filed concurrently herewith, is hereby incorporated by reference herein in its entirety.

Commonly assigned U.S. patent application Ser. No. 13/049,937, entitled "Solvent Based Magnetic Ink Comprising Carbon Coated Magnetic Nanoparticles And Process For Preparing Same", filed concurrently herewith, is hereby incorporated by reference herein in its entirety.

Commonly assigned U.S. patent application Ser. No. 13/050,403, entitled "Magnetic Curable Inks," filed concurrently herewith, is hereby incorporated by reference herein in its entirety.

Commonly assigned U.S. patent application Ser. No. 13/049,950, entitled "Phase Change Magnetic Ink Comprising Surfactant Coated Magnetic Nanoparticles And Process For Preparing Same", filed concurrently herewith, is hereby incorporated by reference herein in its entirety.

Commonly assigned U.S. patent application Ser. No. 13/049,942, entitled "Phase Change Magnetic Ink Comprising Coated Magnetic Nanoparticles And Process For Preparing Same", filed concurrently herewith, is hereby incorporated by reference herein in its entirety.

Commonly assigned U.S. patent application Ser. No. 13/049,945, entitled "Phase Change Magnetic Ink Comprising Inorganic Oxide Coated Magnetic Nanoparticles And Process For Preparing Same", filed concurrently herewith, is hereby incorporated by reference herein in its entirety.

Commonly assigned U.S. patent application Ser. No. 13/050,268, entitled "Curable Inks Comprising Inorganic Oxide-Coated Magnetic Nanoparticles"), filed concurrently herewith, is hereby incorporated by reference herein in its entirety.

Commonly assigned U.S. patent application Ser. No. 13/050,383, U.S. Pat. No. 8,313,666, entitled "Curable Inks Comprising Polymer-Coated Magnetic Nanoparticles", filed concurrently herewith, is hereby incorporated by reference herein in its entirety.

Commonly assigned U.S. patent application Ser. No. 13/050,423, entitled "Curable Inks Comprising Coated Magnetic Nanoparticles", filed concurrently herewith, is hereby incorporated by reference herein in its entirety.

Commonly assigned U.S. patent application Ser. No. 13/050,341, entitled "Curable Inks Comprising Surfactant-Coated Magnetic Nanoparticles"), filed concurrently herewith, is hereby incorporated by reference herein in its entirety.

Commonly assigned U.S. patent application Ser. No. 13/050,223, entitled "Solvent-Based Inks Comprising Coated Magnetic Nanoparticles", filed concurrently herewith, is hereby incorporated by reference herein in its entirety.

Commonly assigned U.S. patent application Ser. No. 13/050,152, entitled "Solvent-Based Inks Comprising Coated Magnetic Nanoparticles", filed concurrently herewith, is hereby incorporated by reference herein in its entirety.

BACKGROUND

Disclosed herein is a phase change magnetic ink including polymer coated magnetic nanoparticles having a core-shell configuration and a process for preparing a phase change magnetic ink.

Non-digital inks and printing elements suitable for MICR printing are known. The two most commonly known technologies are ribbon based thermal printing systems and offset technology. For example, U.S. Pat. No. 4,463,034, which is hereby incorporated by reference herein in its entirety, discloses a heat sensitive magnetic transfer element for printing a magnetic image to be recognized by a magnetic ink character reader, comprising a heat resistant foundation and a heat sensitive imaging layer. The imaging layer is made of a ferromagnetic substance dispersed in a wax and is transferred onto a receiving paper in the form of magnetic image by a thermal printer which uses a ribbon.

U.S. Pat. No. 5,866,637, which is hereby incorporated by reference herein in its entirety, discloses formulations and ribbons which employ wax, binder resin and organic molecule based magnets which are to be employed for use with a thermal printer which employs a ribbon.

MICR ink suitable for offset printing using a numbering box are typically thick, highly concentrated pastes consisting, for example, of over about 60% magnetic metal oxides dispersed in a base containing soy based varnishes. Such inks are commercially available, such as from Heath Custom Press (Auburn, Wash.).

Digital water-based ink-jet inks composition for MICR applications using a metal oxide based ferromagnetic particles of a particle size of less than 500 microns are disclosed in U.S. Pat. No. 6,767,396 (M. J. McElligott et al.) Water based inks are commercially available from Diversified Nano Corporation (San Diego, Calif.).

Magnetic inks are required for two main applications: (1) Magnetic Ink Character Recognition (MICR) for automated check processing, and (2) security printing for document authentication. MICR ink contains a magnetic pigment or a magnetic component in an amount sufficient to generate a magnetic signal strong enough to be readable via a MICR reader. Generally, the ink is used to print all or a portion of a document, such as checks, bonds, security cards, etc.

MICR inks or toners are made by dispersing magnetic particles into an ink base. There are numerous challenges in developing a MICR ink jet ink. For example, most ink jet printers limit considerably the particle size of any particulate components of the ink, due to the very small size of the ink jet print head nozzle that expels the ink onto the substrate. The size of the ink jet print head nozzle openings are generally on the order of about 40 to 50 microns, but can be less than 10 microns in diameter. This small nozzle size requires that the particulate matter contained in an ink jet ink composition must be of a small enough size to avoid nozzle clogging problems. Even when the particle size is smaller than the nozzle size, the particles can still agglomerate or cluster together to the extent that the size of the agglomerate exceeds the size of the nozzle opening, resulting in nozzle blockage. Additionally, particulate matter may be deposited in the nozzle during printing, thereby forming a crust that results in nozzle blockage and/or imperfect flow parameters.

Further, a MICR ink jet ink must be fluid at jetting temperature and not dry. An increase in pigment size can cause a corresponding increase in ink density thereby making it difficult to maintain the pigments in suspension or dispersion within a liquid ink composition.

MICR inks contain a magnetic material that provides the required magnetic properties. The magnetic material must retain a sufficient charge so that the printed characters retain their readable characteristic and are easily detected by the detection device or reader. The magnetic charge retained by a magnetic material is known as "remanence." The magnetic material must exhibit sufficient remanence once exposed to a source of magnetization in order to generate a MICR-readable signal and have the capability to retain the same over time. Generally, an acceptable level of charge, as set by industry standards, is between 50 and 200 Signal Level Units, with 100 being the nominal value, which is defined from a standard developed by American National Standards Institute. A lesser signal may not be detected by the MICR reading device, and a greater signal may not give an accurate reading. Because the documents being read employ the MICR printed characters as a means of authenticating or validating the presented documents, it is important that the MICR characters or other indicia be accurately read without skipping or misreading characters. Therefore, for purposes of MICR, remanence is preferably a minimum of 20 emu/g (electromagnetic unit/gram). A higher remanence value corresponds to a stronger readable signal.

Remanence tends to increase as a function of particle size of the magnetic pigment coating. Accordingly, when the magnetic particle size decreases, the magnetic particles experience a corresponding reduction in remanence. Achieving sufficient signal strength thus becomes increasingly difficult as the magnetic particle size diminishes and the practical limits on percent content of magnetic particles in the ink composition are reached. A higher remanence value will require less total percent magnetic particles in the ink formula, improve suspension properties, and reduce the likelihood of settling as compared to an ink formula with higher percent magnetic particle content.

Additionally, MICR ink jet inks must exhibit low viscosity, typically on the order of less than 15 centipoise (cP) or about 2 to about 12 cP at jetting temperature (jetting temperature ranging from about 25° C. to about 140° C.) in order to function properly in both drop-on-demand type printing equipment, such as piezoelectric printers, and continuous type printing apparatus. The use of low viscosity fluids, however, adds to the challenge of successfully incorporating magnetic particles into an ink dispersion because particle settling will increase in a less viscous fluid as compared to a more viscous fluid.

U.S. Patent Publication Number 2009/0321676A1, which is hereby incorporated by reference herein in its entirety, describes in the Abstract thereof an ink including stabilized magnetic single-crystal nanoparticles, wherein the value of the magnetic anisotropy of the magnetic nanoparticles is greater than or equal to $2 \times 10^4$ J/m$^3$. The magnetic nanoparticle may be a ferromagnetic nanoparticle, such as FePt. The ink includes a magnetic material that minimizes the size of the particle, resulting in excellent magnetic pigment dispersion stability, particularly in non-aqueous ink jet inks. The smaller sized magnetic particles of the ink also maintain excellent magnetic properties, thereby reducing the amount of magnetic particle loading required in the ink.

Magnetic metal nanoparticles are desired for MICR inks because magnetic metal nanoparticles have the potential to provide high magnetic remanence, a key property for enabling MICR ink. However, in many cases, magnetic metal nanoparticles are pyrophoric and thus constitute a safety hazard. Large scale production of phase change inks with such particles is difficult because air and water need to be completely removed when handling these highly oxidizable particles. In addition, the ink preparation process is particularly challenging with magnetic pigments because inorganic magnetic particles can be incompatible with certain organic base ink components.

As noted, magnetic metal nanoparticles are pyrophoric and can be extremely air and water sensitive. Magnetic metal nanoparticles, such as iron nanoparticles of a certain size, typically in the order of a few tens of nanometers or less, have been known to spontaneously ignite when contacted with air. Iron nanoparticles packaged in vacuum sealed bags have been known to become extremely hot even when opened in an inert atmosphere, such as in an argon environment, and have been known to oxidize quickly by the traces of oxygen and water in the argon gas, even when the oxygen and water was present at only about 5 parts per million each, and to lose most of their magnetic remanence property. Large scale production of inks with such particles is problematic because air and water need to be completely removed when handling these materials.

Water-based MICR ink is commercially available. Water-based MICR ink requires special print-heads to be used with certain ink jet printing technology such as phase change or solid ink technology. There is further a concern with respect to possible incompatibility when operating both solid ink and water-based ink in the same printer. Issues such as water evaporation due to the proximity to the solid ink heated ink tanks, rust, and high humidity sensitivity of the solid ink are issues which must be addressed for implementation of a water-based MICR ink in a solid ink apparatus.

Currently, there are no commercially available phase change or solid ink MICR inks. There is a need for a MICR ink suitable for use in phase change or solid ink jet printing. There are numerous challenges in developing a MICR ink suitable for use in phase change or solid ink jet printing. MICR phase change ink processes are particularly challenging with magnetic pigments because (1) inorganic magnetic particles are incompatible with the organic base components of phase change ink carriers, and (2) magnetic pigments are much denser than typical organic pigments (the density of iron is about 8 g/cm$^3$, for example) which can result in unfavorable particle settling, and (3) metal magnetic nanoparticles are pyrophoric thus presenting a safety issue.

Currently available MICR inks and methods for preparing MICR inks are suitable for their intended purposes. However, a need remains for MICR ink jet inks that have reduced magnetic material particle size, improved magnetic pigment dispersion and dispersion stability along with the ability to maintain excellent magnetic properties at a reduced particle loading. Further, a need remains for MICR phase change inks that are suitable for use in phase change ink jet printing technology. Further, a need remains for a process for preparing a MICR ink that is simplified, scalable, environmentally safe, capable of producing a highly dispersible magnetic ink having stable particle dispersion, allowing for safe processing of metal nanoparticles, cost effective, and green.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change magnetic ink comprising a phase change ink carrier; an optional colorant; an optional dispersant; an optional synergist; an optional antioxidant; and a polymer coated magnetic nanoparticle comprising a magnetic core and a polymer shell disposed thereover.

Also described is a process for preparing a phase change magnetic ink comprising combining a phase change ink carrier, an optional colorant, an optional dispersant, an optional synergist, an optional antioxidant, and a polymer coated magnetic nanoparticle comprising a magnetic core and a polymer shell disposed thereover; heating to provide a phase change magnetic ink including the metal nanoparticles; optionally, filtering the phase change magnetic ink while in a liquid state, and cooling the phase change magnetic ink to a solid state.

Also described is a process which comprises (1) incorporating into an ink jet printing apparatus a phase change magnetic ink comprising a phase change ink carrier, an optional colorant, an optional dispersant, an optional synergist, an optional antioxidant; and a polymer coated magnetic nanoparticle comprising a magnetic core and a polymer shell disposed thereover; (2) melting the ink; and (3) causing droplets of the melted ink to be ejected in an imagewise pattern onto a substrate.

DETAILED DESCRIPTION

A phase change magnetic ink is described comprising a phase change ink carrier; an optional colorant; an optional dispersant; an optional synergist; an optional antioxidant; and a polymer coated magnetic nanoparticle comprising a magnetic core and a polymer shell disposed thereover. The polymer shell coating provides an effective barrier against oxygen and as a result provides significant stability against oxidation to the magnetic core of the nanoparticles. These magnetic nanoparticles may be handled in air or under regular inert atmosphere conditions with reduced risk of fire.

The phase change magnetic inks herein can be used for any suitable or desired purpose. In embodiments, the inks herein are used as magnetic ink character recognition (MICR) inks. The inks made according to the present disclosure may be used for MICR applications as well as, for example, in magnetic encoding or in security printing applications, among others. In specific embodiments, the inks herein are used as MICR inks for automated check processing, security printing for document authentication, such as by detecting the magnetic particles in prints which otherwise appear identical. The MICR inks can be used alone or in combination with other inks or printing materials.

The phase change magnetic inks herein can be prepared by any suitable or desired process. In embodiments, a process for preparing a phase change magnetic ink comprises combining a phase change ink carrier, an optional colorant, an optional dispersant, an optional synergist, an optional antioxidant, and a polymer coated magnetic nanoparticle comprising a magnetic core and a polymer shell disposed thereover; heating to provide a phase change magnetic ink including the metal nanoparticles; optionally, filtering the phase change magnetic ink while in a liquid state, and cooling the phase change magnetic ink to a solid state. If desired, additional ink carrier materials or ink components may be added to the ink at a later time, after the initial preparation of a concentrated dispersion containing coated magnetic nanoparticles.

Heating the combined phase change ink carrier, optional colorant, optional dispersant, optional synergist, optional antioxidant, and coated magnetic nanoparticle comprising a magnetic core and a polymeric shell disposed thereover, can comprise heating to any temperature sufficient to provide a melt composition for the selected materials. In embodiments, heating comprises heating to a temperature of about 80° C. to about 180° C., or about 80° C. to about 160° C., or about 100° C. to about 140° C.

If desired, one or more of the phase change ink carrier, optional dispersant, optional synergist, optional antioxidant, and optional colorant can be combined and heated, followed by addition of any additional additives or non-included materials, to provide a first composition which first composition can then be combined with the coated magnetic nanoparticles, followed by further processing, as suitable or desired, to form the phase change magnetic ink composition. In embodiments, a phase change ink concentrate can be prepared by combining polymer coated magnetic nanoparticles into an ink base melt comprising one or more ink base components at a temperature of about 140° C., although not limited, with stiffing to provide a homogenous dispersion; optionally including a synergist, a dispersant, or a combination thereof in the ink base; adding the concentrate mixture to a diluent phase change ink base comprising one or more components, with stiffing to achieve a desired viscosity and concentration; and optionally, filtering the magnetic ink.

Optionally, the phase change magnetic ink can be filtered. In embodiments, the phase change magnetic ink can be filtered while in a liquid state by any suitable or desired method. In embodiments, the phase change magnetic ink is filtered using a nylon cloth filter. In embodiments, the phase change magnetic ink is filtered through a 1 micrometer nylon filter or a 5 micrometer nylon filter in a 70 millimeter Mott filtration assembly (available from Mott Corporation, Farmington, Conn.) at 135° C.

The polymer coated metal magnetic nanoparticles herein are desirably in the nanometer size range. For example, in embodiments, the coated metal nanoparticles have a volume average particle size (such as average particle diameter or longest dimension), total size, including core and shell, of from about 3 to about 500 nanometers (nm), or about 3 to about 300 nm, or about 3 to about 30 nm, or about 10 to about 500 nm, or about 10 to about 300 nm, or about 10 to about 100 nm, or about 10 to about 50 nm, or about 2 to about 20 nm, or about 25 nm. Herein, "average" particle size is typically represented as $d_{50}$, or defined as the volume median particle size value at the 50th percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from images of the particles generated by Transmission Electron Microscopy or from Dynamic Light Scattering measurements.

Magnetic Material.

In embodiments, two types of magnetic metal based phase change inks can be obtained by the process herein, depending on the particle size and shape: ferromagnetic phase change ink and superparamagnetic phase change ink.

In embodiments, the metal nanoparticles herein can be ferromagnetic or superparamagnetic. Ferromagnetic inks become magnetized by a magnet and maintain some fraction of the saturation magnetization once the magnet is removed. The main application of this ink is for Magnetic Ink Character Recognition (MICR) used for check processing.

In embodiments, the inks herein can be superparamagnetic inks. Superparamagnetic inks are also magnetized in the presence of a magnetic field, but they lose their magnetization in the absence of a magnetic field. The main application of superparamagnetic inks is for security printing, although not limited. In this case, an ink containing, for example, magnetic particles as described herein and carbon black appears as a normal black ink but the magnetic properties can be detected by using a magnetic sensor or a magnetic imaging device. Alternatively, a metal detecting device may be used for authenticating the magnetic metal property of secure prints prepared with this ink. A process for superparamagnetic image character recognition (i.e., using superparamagnetic inks) for magnetic sensing is described in U.S. Pat. No. 5,667,924, which is hereby incorporated by reference herein in its entirety.

As described above, the metal nanoparticles herein can be ferromagnetic or superparamagnetic. Superparamagnetic nanoparticles have a remanent magnetization of zero after being magnetized by a magnet. Ferromagnetic nanoparticles have a remanent magnetization of greater than zero after being magnetized by a magnet; that is, ferromagnetic nanoparticles maintain a fraction of the magnetization induced by the magnet. The superparamagnetic or ferromagnetic property of a nanoparticle is generally a function of several factors including size, shape, material selection, and temperature. For a given material, at a given temperature, the coercivity (that is, ferromagnetic behavior) is maximized at a critical particle size corresponding to the transition from multidomain to single domain structure. This critical size is referred to as the critical magnetic domain size (Dc, spherical). In the single domain range, there is a sharp decrease of the coercivity and remanent magnetization when decreasing the particle size, due to thermal relaxation. Further decrease of the particle size results in complete loss of induced magnetization because the thermal effect becomes dominant and is sufficiently strong to demagnetize previously magnetically saturated nanoparticles. Superparamagnetic nanoparticles have zero remanence and coercivity. Particles of a size of about and above the Dc are ferromagnetic. For example, at room temperature, the Dc for iron is about 15 nanometers, for fcc cobalt is about 7 nanometers, and for nickel about 55 nanometers. Further, iron nanoparticles having a particle size of 3, 8, and 13 nanometers are superparamagnetic while iron nanoparticles having a particle size of 18 to 40 nanometers are ferromagnetic. For alloys, the Dc value may change depending on the materials. For further detail, see Burke, et al., Chemistry of Materials, pages 4752-4761, 2002. For still further detail, see U.S. Publication 20090321676, (Breton, et al.), which is hereby incorporated by reference herein in its entirety; B. D. Cullity and C. D. Graham, Introduction to Magnetic Materials, IEEE Press (Wiley), 2nd Ed., 2009, Chapter 11, Fine Particles and Thin Films, pages 359-364; Lu et al., Angew. Chem. Int. Ed. 2007, 46, pages 1222-444, Magnetic Nanoparticles: Synthesis, Protection, Functionalization and Application, each of which are hereby incorporated by reference herein in their entireties.

Any suitable or desired metal can be used for the nanoparticle core in the present process. In embodiments, the magnetic nanoparticles comprise a core selected from the group consisting of Fe, Mn, Co, Ni, and mixtures and alloys thereof. In other embodiments, the magnetic nanoparticles comprise a core selected from the group consisting of Fe, Mn, Co, Ni, FePt, CoPt, MnAl, MnBi, and mixtures and alloys thereof. In certain specific embodiments, the metal nanoparticles comprise at least one of Fe, Mn, and Co.

In further embodiments, the metal nanoparticles are bimetallic or trimetallic nanoparticles. In specific embodiments, the metal nanoparticles comprise a bimetallic or trimetallic core. Examples of suitable bimetallic magnetic nanoparticles include, without limitation, CoPt, fcc phase FePt, fct phase FePt, FeCo, MnAl, MnBi, mixtures thereof, and the like. Examples of trimetallic nanoparticles can include, without limitation, tri-mixtures of the above magnetic nanoparticles, or core/shell structures that form trimetallic nanoparticles, such as cobalt covered fct phase FePt.

The magnetic nanoparticles may be prepared by any method known in the art, including ball-milling attrition of larger particles (a common method used in nano-sized pigment production), followed by annealing. Annealing is generally necessary because ball milling produces amorphous nanoparticles, which need to be subsequently crystallized into the required single crystal form. The nanoparticles can also be made directly by radio frequency (RF) plasma. Appropriate large-scale RF plasma reactors are available from Tekna Plasma Systems (Sherbrooke, Québec).

Polymer Coated Magnetic Nanoparticles.

The polymer coated magnetic nanoparticles can have any possible shape or configuration. The polymer coated magnetic nanoparticles comprise a magnetic metal core having a polymer coating material or shell disposed thereover. The polymer coating material or shell can serve to protect the metal nanoparticles. In embodiments, the polymer coating or shell provides air and moisture stability to the magnetic metal nanoparticles rendering the magnetic metal nanoparticles safe to handle.

In embodiments, the magnetic nanoparticles comprise a shell having a thickness of from about 0.2 nanometers (nm) to about 100 nm, or from about 0.5 nm to about 50 nm, or from about 1 nm to about 20 nm.

The magnetic nanoparticles may be shape. Exemplary shapes of the magnetic nanoparticles can include, without limitation, needle-shape, granular, globular, platelet-shaped, acicular, columnar, octahedral, dodecahedral, tubular, cubical, hexagonal, oval, spherical, dendritic, prismatic, amorphous shapes, and the like. An amorphous shape is defined in the context of the present disclosure as an ill defined shape having a recognizable shape. For example, an amorphous shape has no clear edges or angles. The ratio of the major to minor size axis of the single nanocrystal (D major/D minor) can be less than about 10:1, less than about 2:1, or less than about 3:2. In a specific embodiment, the magnetic core has a needle-like shape with an aspect ratio of about 3:2 to less than about 10:1.

Any suitable or desired polymer coating material or combination of coating materials can be selected for the coating or shell herein. In embodiments, the magnetic nanoparticles comprise a shell comprising a polymer selected from the group consisting of polymethylmethacrylate, polystyrene, polyester, and mixtures and combinations thereof. Other suitable polymer materials include, without limitation, thermoplastic resins, homopolymers of styrene or substituted styrene such as polystyrene, polychloroethylene, and polyvinyltoluene; styrene copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyester; polyvinyl butyral; polyacrylic resin; rosin; modified rosin; terpene resin; phenolic resin; aliphatic or aliphatic hydrocarbon resin; aromatic petroleum resin; chlorinated paraffin; paraffin wax, and the like.

In certain embodiments, the shell comprises a polymer selected from the group consisting of polymethylmethacrylate, polystyrene, polyester, styrene copolymers with p-chlorostyrene, propylene, vinyltoluene, vinylnaphthalene, methyl acrylate, ethyl acrylate, butyl acrylate, octyl acrylate, methyl methacrylate, ethyl methacrylate, butyl methacrylate, methyl α-chloromethacrylate, acrylonitrile copolymer with methyl ether, vinyl ethyl ether, vinyl methyl ketone, butadiene, isoprene, acrylonitrile-indene, maleic acid, and maleic acid ester; polybutyl methacrylate, polyvinyl chloride, polyvinyl acetate, polyethylene, polypropylene, polyvinyl butyral, polyacrylic resin, rosin, modified rosin, terpene resin, phenolic resin, aliphatic resin, aliphatic hydrocarbon resin, aromatic petroleum resin, chlorinated paraffin, paraffin wax, polyvinylidene chloride, ethylene vinyl alcohol, polycaprolactam, polyvinylidene chloride-methyl acrylate copolymer, and combinations thereof.

The polymer shell can comprise homopolymers or copolymers, which can be linear or branched, random or block copolymers. In one embodiment, the polymer shell comprises a polymer selected from the group consisting of homopolymers, copolymers, linear homopolymers, branched homopolymers, linear copolymers, branched copolymers, random copolymers, block copolymers, or a combination thereof.

In specific embodiments, the polymer shell can comprise oxygen barrier polymer materials including, but not limited to, polyvinylidene chloride, ethylene vinyl alcohol, high density polyethylene, polycaprolactam (Nylon 6), among others, and combinations thereof. Suitable oxygen bather materials are available, for example, from Dow Chemicals, such as the SARAN™ series of resins (For example, 168 and 519). Copolymers are also suitable. For example, SARAN™ XU 32019.10L Blend, available from Dow Chemicals, which is a copolymer made of polyvinylidene chloride and methyl acrylate monomers. Other examples include SARAN™ XU 32019.39 Blend and SARAN™ XU 32019.40 Blend. Additionally, certain oxygen barrier polymers, particularly copolymers of polyvinylidene chloride with other co-monomers are soluble in various solvents at various temperatures. Examples include (solvent and the temperature at which the polymer dissolves):

1) polyvinylidene chloride homopolymer: N-methylpyrrolidine (42° C.); tetramethylene sulfoxide (28° C.); N-acetylpiperidine (34° C.);

2) polyvinylidene chloride copolymers: tetrahydrofuran (<60° C.); 1,4-dioxane (50-100° C.); cyclohexanone (50-100° C.).

The polymer coating or shell provides stability against air and moisture but also increases compatibility of the magnetic particles with the phase change ink base. This is because both the polymer coating or shell and the ink base are organic materials. Thus, the materials herein advantageously achieve or enhance compatibility and, as a result, dispersibility of the magnetic nanoparticles when compared with bare magnetic metal nanoparticles. As a result, in embodiments, dependant on the selected ink base components and type of polymer, a synergist or dispersant may not be required at all or the amount needed can be significantly decreased. Therefore, in embodiments, the phase change magnetic ink herein can be free of dispersant, free of synergist, or free of both dispersant and synergist.

The polymer coated metal nanoparticles can be prepared by any suitable or desired method. For example, polymer coated nanoparticles can be obtained via synthetic and non synthetic routes including, but not limited to: 1) polymerization of the nanoparticle surface; 2) adsorption onto the nanoparticles; 3) surface modifications via polymerization processes; 4) self-assembled polymer layers; 5) inorganic and composite coatings including precipitation and surface reactions and controlled deposition of preformed inorganic colloids; and 6) use of biomacromolecular layers.

Further, the surface of magnetic nanoparticles can be modified by various methods including: 1) grafting; 2) atomic transfer radical polymerization (ATRP) and reversible addition-fragmentation chain transfer (RAFT) polymerization techniques (the second one using a chain transfer agent but no metal catalyst); 3) solvent evaporation; 4) layer by layer process; 5) phase separation; 6) sol-gel transition; 7) precipitation; 8) heterogeneous polymerization in the presence of magnetic particles; 9) suspension/emulsion polymerization; 10) microemulsion polymerization; 11) dispersion polymerization. A number of techniques for the preparation of magnetic nano- and micronized particles are also described in J. Sep. Sci. 2007, 30, 1751-1772.

Polymer coated metal nanoparticles can also be prepared using sonochemistry, for example, chemical grafting of antioxidant molecules with additional hydrophobic polymer coating directly onto $TiO_2$ particle surfaces, pulse-plasma techniques, use of supercritical fluids, for example, use of supercritical and anti-solvent processing for coating/encapsulation of microparticles with a polymer, use of electrohydrodynamic atomization for the production of narrow-size-distribution polymer-pigment-nanoparticle composites.

Encapsulation or coating and surface modifications of nanoparticles and particularly magnetic nanoparticles with polymers can also be by formation of polymer coated iron nanoparticles by thermal decomposition of iron pentacarbonyl in a solvent in the presence of a modified polymer structure with a terminal anchoring group, tetraethylenepentaamine (TEPA). After filtration and solvent removal, the core-shell iron nanoparticles contain a shell made out of the polymeric material. Iron nanoparticles can be thus formed with, for example: polyisobutylene, polystyrene, and polyethylene. Further, polystyrene coated nanoparticles can be are obtained by thermal decomposition of iron carbonyl gas in the presence of styrene monomer by using plasma polymerization techniques. The plasma generated heat initiates fast decomposition of the iron carbonyl while at the same time the styrene breaks down forming free radicals which initiate the polymerization process on the surface of the generated iron nanoparticles.

Further, polystyrene coated cobalt nanoparticles are described in U.S. Publication 2010/0015472A1 (Bradshaw), which is hereby incorporated by reference herein in its entirety. The process comprises thermal decomposition of dicobalt octacarbonyl in dichlorobenzene as a solvent in the presence of a polystyrene polymer terminated with a phosphine oxide group and an amine terminated polystyrene, at 160° C. under argon. The process provides magnetic cobalt nanoparticles having a polymer coating including a polystyrene shell. Additionally, other polymer shells can be placed on the surface of the coated cobalt nanoparticles by exchange of the original polystyrene shell with other polymers. For example, the shell on the coated nanoparticles can be replaced with a polymethylmethacrylate shell through an exchange reaction with polymethyl methacrylate (PMMA) in toluene. These polymer coated magnetic nanoparticle materials are suitable for fabrication of the magnetic inks herein.

Further, U.S. Publication 2007/0249747A1 (Tsuji, et al.), which is hereby incorporated by reference herein in its entirety, discloses fabrication of polymer coated metal nanoparticles from metal nanoparticles including magnetic FePt nanoparticles having a particle size of about 4 nanometers by stirring a FePt nanoparticle dispersion in the presence of an SH terminated polymer. Suitable polymers include —SH terminated PMMA.

The polymer shell material can comprise a polymer terminated with a functional group. Terminal functional groups which can be present on polymers suitable for coating the present magnetic nanoparticles include, but are not limited to, functional groups selected from the group consisting of amide, amine, carboxylic acid, phosphine oxide, carboxylic ester, alcohol, thiol, and combinations thereof.

For further detail on various methods for preparing suitable polymer coated magnetic nanoparticles suitable for use for the present fabrication of a magnetic solid ink, see Frank Caruso, Adv. Mater., 2001, 13, 11-22, New J. Chem., 1994, 18, 1087, J. Sep. Sci. 2007, 30, 1751-1772, Chem. Commun. (2007), 4815-4817, J. of Macromolecular Science, Part B: Physics, 45: 899-909, 2006, J. of Supercritical Fluids, 28 (2004), 85-890, Burke et al., Chem. Mater., 14, 4752-61 (2002), Srikanth, et al., Appl. Phys. Lett., 79, 3503-5 (2001)], International Publication Number WO9323795(A1), U.S. Patent Publication 20100015472, American Journal of Applied Sciences (2009), 6(7), 1352-1358, International Publication Number WO2009025623(A1), U.S. Patent Publication 20070249747, each of which is hereby incorporated by reference herein in its entirety.

The loading requirements of the magnetic nanoparticles in the ink may be any suitable or desired amount, in embodiments, from about 0.5 weight percent to about 30 weight percent, about 5 weight percent to about 10 weight percent, or about 6 weight percent to about 8 weight percent, although the amount can be outside of these ranges.

In embodiments, the magnetic nanoparticle can have a remanence of about 20 emu/g to about 100 emu/g, from about 30 emu/g to about 80 emu/g, or from about 50 emu/g to about 70 emu/g, although the amount can be outside of these ranges. In a specific embodiment, the magnetic nanoparticles have a remanence of about 20 emu/gram to about 100 emu/gram.

In embodiments, the coercivity of the magnetic nanoparticle can be about 200 Oersteds to about 50,000 Oersteds, about 1,000 Oersteds to about 40,000 Oersteds, or about 10,000 Oersteds to about 20,000 Oersteds, although the amount can be outside of these ranges.

In embodiments, the magnetic saturation moment may be, for example, about 20 emu/g to about 150 emu/g, about 30 emu/g to about 120 emu/g, or about 40 emu/g to about 80 emu/g, although the amount can be outside of these ranges. In embodiments, the magnetic nanoparticles have a magnetic saturation moment of from about 20 emu/g to about 150 emu/g.

Carrier Material.

The MICR phase change ink herein can include any desired or effective carrier composition. Examples of suitable ink carrier materials include fatty amides, such as monoamides, tetraamides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

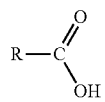

wherein R is an alkyl group, including linear, branched, saturated, unsaturated, and cyclic alkyl groups, said alkyl group having, in embodiments from about 36 to about 200 carbon atoms, although the number of carbon atoms can be outside of this range. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 5,372,852, U.S. Pat. No. 5,597,856, and U.S. Pat. No. 6,174,937 the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, and U.S. Pat. No. 6,309,453, the disclosures of each of which are totally incorporated herein by reference.

Mixtures of fatty amide materials and isocyanate-derived materials can also be employed as the ink carrier composition for inks of the present disclosure.

Additional suitable phase change ink carrier materials for the present disclosure include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The carrier can be present in any suitable or desired amount. In embodiments, the ink carrier is present in the phase change ink in an amount of about 0.1 percent to no more than about 99 percent by weight of the ink.

Dispersant.

Dispersants may optionally be present in the ink formulation. The role of the dispersant is to further ensure improved dispersion stability of the coated magnetic nanoparticles by stabilizing interactions with the coating material. Suitable dispersants include, but are not limited to, oleic acid; trioctyl phosphine oxide (TOPO), hexyl phosphonic acid (HPA); polyvinylpyrrolidone (PVP) derivatives, and combinations thereof. Suitable dispersants may also include beta-hydroxy carboxylic acids and their esters, sorbitol esters with long chain aliphatic carboxylic acids, polymeric compounds such as polyvinylpyrrolidone and derivatives, and Solsperse® polymeric dispersants and combinations thereof. Further examples of suitable dispersants may include Disperbyk®

108, Disperbyk® 116, (BYK), Borchi® GEN 911, Irgasperse® 2153 and 2155 (Lubrizol), acid and acid ester waxes from Clariant, for example Licowax®. Suitable dispersants are also described in U.S. Patent Publication 2010/0292467, which is hereby incorporated by reference herein in its entirety. Further suitable dispersants are also described in U.S. patent application Ser. No. 12/641,564, which is hereby incorporated by reference herein in its entirety, and in U.S. patent application Ser. No. 12/891,619, which is hereby incorporated by reference herein in its entirety. Additional suitable dispersants include beta-hydroxy carboxylic acids and their esters containing long linear, cyclic or branched aliphatic chains, such as those having about 5 to about 60 carbons, such as pentyl, hexyl, cyclohexyl, heptyl, octyl, nonyl, decyl, undecyl, and the like; sorbitol esters with long chain aliphatic carboxylic acids such as lauric acid, oleic acid (SPAN® 85), palmitic acid (SPAN® 40), and stearic acid (SPAN® 60); polymeric compounds such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), and combinations thereof. In embodiments, the dispersant is selected from the group consisting of oleic acid, lauric acid, palmitic acid, stearic acid, trioctyl phosphine oxide, hexyl phosphonic acid, polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), pentyl, hexyl, cyclohexyl, heptyl, octyl, nonyl, decyl, or undecyl beta-hydroxy carboxylic acid, and combinations thereof.

The dispersant can be present in any suitable or desired amount. In embodiments, the dispersant is present in the phase change ink in an amount of about 0.1 percent to about 10 percent by weight of the ink.

Synergist.

In embodiments, a synergist may also be included in the ink base. The synergist can be added at any suitable or desired time.

The synergist can be present in any suitable or desired amount. In embodiments, the synergist is present in the phase change ink in an amount of about 0.1 percent to about 10 percent by weight of the ink.

Any suitable or desired synergist can be employed. In embodiments, the synergist may be selected from Slosperse® 5000 or Slosperse® 17000, available from Lubrizol Corporation.

Antioxidant.

The inks of the present disclosure can also optionally contain an antioxidant. The optional antioxidants of the ink compositions protect the images from oxidation and also protect the ink components from oxidation during the heating portion of the ink preparation process.

Specific examples of suitable antioxidants include NAUGUARD® 524, NAUGUARD® 76, and NAUGUARD® 512, commercially available from Chemtura Corporation (Philadelphia, Pa.), IRGANOX® 1010, commercially available from BASF, and the like. When present, the optional antioxidant is present in the ink in any desired or effective amount, such as from about 0.01 percent to about 20 percent by weight of the ink.

Viscosity Modifier.

The inks of the present disclosure can also optionally contain a viscosity modifier. The viscosity of the ink composition can be tuned by using appropriate additives. Examples of suitable viscosity modifiers include aliphatic ketones, such as stearone, and the like, polymers such as polystyrene and polymethylmethacrylate, thickening agents such as those available from BYK Chemie, and others. When present, the optional viscosity modifier is present in the ink in any desired or effective amount, such as from about 0.1 to about 99 percent by weight of the ink.

Other optional additives to the inks include clarifiers, tackifiers, such as FORAL® 85, a glycerol ester of hydrogenated abietic (rosin) acid (commercially available from Eastman), FORAL® 105, a pentaerythritol ester of hydroabietic (rosin) acid (commercially available from Eastman), CELLOLYN® 21, a hydroabietic (rosin) alcohol ester of phthalic acid (commercially available from Eastman), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Cray Valley), and the like; adhesives, such as VERSAMID® 757, 759, or 744 (commercially available from Cognix), plasticizers, such as UNIPLEX® 250 (commercially available from Uniplex), the phthalate ester plasticizers commercially available from Ferro under the trade name SANTICIZER®, such as dioctyl phthalate, diundecyl phthalate, alkylbenzyl phthalate (SANTICIZER® 278), triphenyl phosphate (commercially available from Ferro), KP-14010, a tributoxyethyl phosphate (commercially available from Chemtura Corporation), MORFLEX® 150, a dicyclohexyl phthalate (commercially available from Vertellus Specialties Inc.), trioctyl trimellitate (commercially available from Eastman Kodak Co.), and the like.

Such additives can be included in conventional amounts for their usual purposes. The optional additives may be present in any suitable or desired amount, such as from about 0.1 to about 50 percent by weight of the ink.

Colorant.

The phase change inks of the present disclosure can further contain a colorant compound. This optional colorant can be present in the ink in any desired or effective amount to obtain the desired color or hue, in embodiments from about 1 percent to about 20 percent by weight of the ink. The colorant can be any suitable or desired colorant including dyes, pigments, mixtures thereof, and the like. In embodiments, the colorant selected for the phase change magnetic inks herein is a pigment. In a specific embodiment, the colorant selected for the phase change magnetic inks herein is carbon black.

Suitable colorants for use in the MICR ink according to the present disclosure include, without limitation, carbon black, lamp black, iron black, ultramarine, Nigrosine dye, Aniline Blue, DuPont® Oil Red, Quinoline Yellow, Methylene Blue Chloride, Phthalocyanine Blue, Phthalocyanine Green, Rhodamine 6C Lake, Chrome Yellow, quinacridone, Benzidine Yellow, Malachite Green, Hansa Yellow C, Malachite Green hexylate, oil black, azo oil black, Rose Bengale, monoazo pigments, disazo pigments, trisazo pigments, tertiary-ammonium salts, metallic salts of salicylic acid and salicylic acid derivatives, Fast Yellow G3, Hansa Brilliant Yellow 5GX, Disazo Yellow AAA, Naphthol Red HFG, Lake Red C, Benzimidazolone Carmine HF3CS, Dioxazine Violet, Benzimidazolone Brown HFR, Aniline Black, titanium oxide, Tartrazine Lake, Rhodamine 6G Lake, Methyl Violet Lake, Basic 6G Lake, Brilliant Green lakes, Hansa Yellow, Naphthol Yellow, Rhodamine B, Methylene Blue, Victoria Blue, Ultramarine Blue, and the like.

The MICR ink as prepared is a black or dark brown. The MICR ink according to the present disclosure may be produced as a colored ink by adding a colorant during ink preparation. Alternatively, a non-colored (that is, free of added colorant) MICR ink may be printed on a substrate during a first pass, followed by a second pass, wherein a colored ink that is lacking MICR particles is printed directly over the MICR ink, so as to render the colored ink MICR-readable. In embodiments, the process herein can comprise (1) incorporating into an ink jet printing apparatus a phase change magnetic ink comprising a phase change ink carrier, an optional colorant, an optional dispersant, an optional synergist, an optional antioxidant; and a polymer coated magnetic nanoparticle comprising a magnetic core and a shell disposed thereover; (2) melting the ink; and (3) causing droplets of the melted ink to be ejected in an imagewise pattern onto a substrate; (4) incorporating into an ink jet printing apparatus a phase change ink comprising a phase change ink carrier, a colorant, an optional dispersant, an optional synergist, and an optional antioxidant; (5) melting the ink; and (6) causing droplets of the melted ink of (5) to be ejected in an imagewise pattern onto a substrate, wherein the imagewise pattern covers the imagewise pattern of (3) such that the ink of (4) is rendered MICR-readable.

In embodiments, the MICR phase change ink compositions herein have melting points of no lower than about 50° C. and no higher than about 150° C., although the melting point can be outside of these ranges.

In embodiments, the MICR phase change ink compositions herein have melt viscosities at the jetting temperature (in embodiments no lower than about 75° C. and no higher than about 140° C., although the jetting temperature can be outside of this range) of no more than about 25 centipoise or no less than about 2 centipoise, although the melt viscosity can be outside of these ranges.

The MICR phase change inks of the present disclosure can be employed in apparatus for direct printing ink jet processes and in indirect (offset) printing ink jet applications. Another embodiment of the present disclosure is directed to a process which comprises incorporating a MICR phase change ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. In embodiments, the substrate is a final image recording substrate such as a final image recording sheet and droplets of the melted ink are ejected in an imagewise pattern directly onto the final recording substrate (for example, direct to paper). Yet another embodiment of the present disclosure is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. In embodiments, the intermediate transfer member is heated to a temperature above that of the final recording sheet and below that of the melted ink in the printing apparatus. Inks of the present disclosure can also be employed in other hot melt printing processes, such as hot melt acoustic ink jet printing, hot melt thermal ink jet printing, hot melt continuous stream or deflection ink jet printing, and the like. Phase change inks of the present disclosure can also be used in printing processes other than hot melt ink jet printing processes.

Any suitable substrate or recording sheet can be employed, including plain papers such as XEROX® 4200 papers, XEROX® Image Series papers, ruled notebook paper, bond paper, silica coated papers such as Sharp Company silica coated paper, JuJo® paper, Hammermill® Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

1.a. Polystyrene Coated Nanoparticles.

Polystyrene coated cobalt nanoparticles are obtained by thermal decomposition of dicobalt octacarbonyl in dichlorobenzene as a solvent in the presence of a polystyrene polymer terminated with a phosphine oxide group, and an amine terminated polystyrene in a ratio of 4:1 (w/w) at 160° C. under argon for 30 minutes. The reaction mixture is precipitated into hexane and further washed to provide polystyrene coated cobalt nanoparticles. The fabrication process is described in U.S. Publication 20100015472 A1 (Bradshaw).

Magnetic Phase Change Ink with Polymer Coated Magnetic Nanoparticles.

1.b. Concentrate Ink.

Into a Szegvari 01 attritor available from Union Process are charged 1,800.0 grams of ⅛ inch diameter 440C Grade 25 steel balls available from Hoover Precision Products, Inc., having been first pre-cleaned in acetone, then toluene, to remove potential residual oils and greases, then dried in an oven heated at 120° C. to remove the solvents. The following components are added together and melt-mixed at 120° C. in a 600 milliliter beaker: 89.86 grams of Kemamide® S-180 (stearyl stearamide available from Chemtura Corporation) and 15.12 grams of Solsperse® 17000 (polymeric dispersant available from Lubrizol Corporation). After a homogeneous solution is obtained, the mixture is quantitatively transferred to the attritor vessel whereupon 3.02 grams of Solsperse® 5000 (synergist agent available from Lubrizol Corporation) are added. Attrition of Solsperse® 5000 proceeds for 1 hour at 175 RPM whereupon 72 grams of polymer-coated iron particles prepared as described in Example 1.a above are added to the attritor vessel. The pigmented mixture is allowed to attrite overnight for 19 hours at 225 RPM upon which the resultant concentrate is subsequently discharged, separated from the steel balls in its molten state, and then allowed to freeze.

1.c. Magnetic Ink Preparation With Polymer Coated Magnetic Nanoparticles.

A magnetic ink is formed from the concentrate of Example 1.b. in the following manner. The following components are added together and melt-mixed at 120° C. in a 600 milliliter beaker to form Solution #1: 71.9 grams of a distilled polyethylene wax from Baker Petrolite, 16.45 grams of a triamide wax (triamide described in U.S. Pat. No. 6,860,930), 4.97 grams Kemamide® S-180 (stearyl stearamide available from Chemtura Corporation), 16.59 grams of KE-100® resin (an ester of tetrahydroabietic acid and glycerol available from Arakawa Corporation), 2.28 grams of urethane resin (as described in Example 4 of U.S. Pat. No. 6,309,453), and 0.3 grams of Naugard® 445 (an antioxidant available from Chemtura Corporation). Into a 250 milliliter beaker is transferred 37.5 grams of the concentrate formed in Example 1.b., allowed to melt in an oven at 120° C., and then transferred to a hot plate equipped with an overhead stirrer. The concentrate is stirred at low speed to avoid splashing as Solution #1 is slowly added. Additional stiffing continues at increased speed of 300 RPM for 2 hours wherein a magnetic ink is formed.

Example 2

Counter example of fire hazard with uncoated metal nanoparticles. Uncoated iron nanoparticles (50 nanometers average particle size) from MTI Corp. (Richmond, Calif., USA) were opened in a glove box which had first been inerted with Argon such that the oxygen and humidity levels were 5 ppm (parts per million) and 5 ppm, respectively, as a safety precaution. Even under these conditions they instantly became very hot. They were oxidized quickly by the traces of oxygen and water in the argon gas (about 5 ppm each) and essentially lost most of their magnetic remanence property. If opened in air, these pyrophoric materials would have ignited instantly.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A black or dark brown phase change magnetic ink comprising: a phase change ink carrier;
    an optional colorant;
    an optional dispersant;
    an optional synergist;
    an optional antioxidant; and
    a polymer coated magnetic nanoparticle comprising a magnetic core and a polymer shell having a thickness of from about 0.2 nanometers to about 100 nanometers disposed thereover;
    wherein the shell comprises a polymer terminated with a functional group, wherein the functional group is selected from the group consisting of amide, amine, carboxylic acid, phosphine oxide, carboxylic ester, alcohol, thiol, and combinations thereof.

2. The phase change magnetic ink of claim 1, wherein the polymer shell comprises a polymer selected from the group consisting of homopolymers, copolymers, linear homopolymers, branched homopolymers, linear copolymers, branched copolymers, random copolymers, block copolymers, or a combination thereof.

3. The phase change magnetic ink of claim 1, wherein the shell comprises an oxygen barrier polymer.

4. The phase change magnetic ink of claim 1, wherein the shell comprises a polymer selected from the group consisting of polymethylmethacrylate, polystyrene, polyester, styrene copolymers with p-chlorostyrene, propylene, vinyltoluene, vinylnaphthalene, methyl acrylate, ethyl acrylate, butyl acrylate, octyl acrylate, methyl methacrylate, ethyl methacrylate, butyl methacrylate, methyl α-chloromethacrylate, acrylonitrile copolymer with methyl ether, vinyl ethyl ether, vinyl methyl ketone, butadiene, isoprene, acrylonitrile-indene, maleic acid, and maleic acid ester; polybutyl methacrylate, polyvinyl chloride, polyvinyl acetate, polyethylene, polypropylene, polyvinyl butyral, polyacrylic resin, rosin, modified rosin, terpene resin, phenolic resin, aliphatic resin, aliphatic hydrocarbon resin, aromatic petroleum resin, chlorinated paraffin, paraffin wax, polyvinylidene chloride, ethylene vinyl alcohol, polycaprolactam, polyvinylidene chloride-methyl acrylate copolymer, and combinations thereof.

5. The phase change magnetic ink of claim 1, wherein the ink is free of dispersant, free of synergist, or free of both dispersant and synergist.

6. The phase change magnetic ink of claim 1, wherein the magnetic nanoparticles are ferromagnetic or superparamagnetic.

7. The phase change magnetic ink of claim 1, wherein the magnetic nanoparticles comprise a bimetallic or trimetallic core.

8. The phase change magnetic ink of claim 1, wherein the magnetic nanoparticles comprise a core selected from the group consisting of Fe, Mn, Co, Ni, FePt, CoPt, MnAl, MnBi, and mixtures and alloys thereof.

9. The phase change magnetic ink of claim 1, wherein the magnetic nanoparticles have a volume average particle diameter of from about 3 to about 300 nanometers.

10. The phase change magnetic ink of claim 1, wherein the phase change ink carrier comprises one or more materials selected from the group consisting of paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

11. The phase change magnetic ink of claim 1, wherein the dispersant is selected from the group consisting of oleic acid, trioctyl phosphine oxide, hexyl phosphonic acid, polyvinylpyrrolidone derivatives, and combinations thereof.

12. The phase change magnetic ink of claim 1, wherein the magnetic core has a needle-like shape with an aspect ratio of 3:2 to 10:1.

13. The phase change magnetic ink of claim 1, wherein the magnetic nanoparticles have a magnetic saturation moment of about 20 emu/g to about 150 emu/g.

14. The phase change magnetic ink of claim 1, wherein the magnetic nanoparticles have a remanence of about 20 emu/gram to about 100 emu/gram.

15. A process for preparing a black or dark brown phase change magnetic ink comprising: combining a phase change ink carrier, an optional colorant, an optional dispersant, an optional synergist, an optional antioxidant, and a polymer coated magnetic nanoparticle comprising a magnetic core and a polymer shell having a thickness of from about 0.2 nanometers to about 100 nanometers disposed thereover, wherein the shell comprises a polymer terminated with a functional group, wherein the functional group is selected from the group consisting of amide, amine, carboxylic acid, phosphine oxide, carboxylic ester, alcohol, thiol, and combinations thereof;
    heating to provide a phase change magnetic ink including the metal nanoparticles;
    optionally, filtering the phase change magnetic ink while in a liquid state, and
    cooling the phase change magnetic ink to a solid state.

16. A process which comprises:
(1) incorporating into an ink jet printing apparatus a phase change magnetic ink comprising a black or dark brown phase change ink comprising a phase change ink carrier, an optional colorant, an optional dispersant, an optional synergist, an optional antioxidant; and a polymer coated magnetic nanoparticle comprising a magnetic core and a polymer shell having a thickness of from about 0.2 nanometers to about 100 nanometers disposed thereover, wherein the shell comprises a polymer terminated with a functional group, wherein the functional group is selected from the group consisting of amide, amine, carboxylic acid, phosphine oxide, carboxylic ester, alcohol, thiol, and combinations thereof;

(2) melting the ink; and (3) causing droplets of the melted ink to be ejected in an imagewise pattern onto a substrate.

17. The process of claim 16, comprising steps (1), (2), and (3), and further comprising:

(4) incorporating into an ink jet printing apparatus a phase change ink comprising a phase change ink carrier, a colorant, an optional dispersant, an optional synergist, and an optional antioxidant;

(5) melting the ink; and (6) causing droplets of the melted ink of (5) to be ejected in an imagewise pattern onto a substrate, wherein the imagewise pattern covers the imagewise pattern of (3) such that the ink of (4) is rendered MICR-readable.

18. The process of claim 16, wherein the substrate is a final recording substrate and droplets of the melted ink are ejected in an imagewise pattern directly onto the final recording substrate.

* * * * *